United States Patent
Finkelshtain et al.

(10) Patent No.: US 6,773,470 B2
(45) Date of Patent: Aug. 10, 2004

(54) SUSPENSIONS FOR USE AS FUEL FOR ELECTROCHEMICAL FUEL CELLS

(75) Inventors: Gennadi Finkelshtain, Shoham (IL); Yuri Katzman, Hadera (IL); Nikolai Fishelson, Jerusalem (IL); Zina Lurie, Netanya (IL)

(73) Assignee: More Energy Ltd., Yehud (IL)

( * ) Notice: Subject to any disclaimer, the term of this patent is extended or adjusted under 35 U.S.C. 154(b) by 8 days.

(21) Appl. No.: 10/230,204

(22) Filed: Aug. 29, 2002

(65) Prior Publication Data

US 2003/0099876 A1 May 29, 2003

Related U.S. Application Data

(63) Continuation-in-part of application No. 09/752,551, filed on Jan. 3, 2001, now Pat. No. 6,554,877.
(60) Provisional application No. 60/399,167, filed on Jul. 30, 2002.

(51) Int. Cl.[7] ............................... C10L 1/12; C10L 1/18
(52) U.S. Cl. ............................. 44/457; 44/436; 44/445; 44/628; 516/20; 516/78; 429/46; 429/105
(58) Field of Search .......................... 44/457, 436, 445; 44/628; 516/20, 78; 429/46, 105

(56) References Cited

U.S. PATENT DOCUMENTS

| | | | |
|---|---|---|---|
| 3,346,506 A | * | 10/1967 | Beumel .................. 252/188.25 |
| 3,460,906 A | * | 8/1969 | Lenz ........................... 423/274 |
| 4,081,252 A | | 3/1978 | Osborg |
| 4,262,065 A | | 4/1981 | Giattino |
| 4,390,605 A | | 6/1983 | Marhanka |
| 5,084,144 A | | 1/1992 | Reddy et al. |
| 5,573,866 A | | 11/1996 | Van Dine et al. |
| 5,599,640 A | | 2/1997 | Lee et al. |
| 5,804,329 A | | 9/1998 | Amendola |
| 5,846,669 A | | 12/1998 | Smotkin et al. |
| 5,904,740 A | | 5/1999 | Davis |
| 6,534,033 B1 | * | 3/2003 | Amendola et al. ....... 423/648.1 |

FOREIGN PATENT DOCUMENTS

| | | | |
|---|---|---|---|
| DE | 3238963 | 10/1982 | ........... C07C/31/30 |
| WO | WO02/054506 | 7/2002 | |

OTHER PUBLICATIONS

Savadogo et al; "The electrooxidation of some acetals for direct hydrocarbons fuel cell applications" IIIrd International Symposium on electrocatalysis, Slovenia, 1999 p57.
Lamy et al; "Direct anodic oxidation of methanol, ethanol and higher alcohols and hydrocarbons in PEM fuel cells" IIIrd International Symposium on electrocatalysis, Slovenia, 1999 p 95.
Lel; "The characterization of an alkaline fuel cell that uses hydrogen storage alloys" Journal Of The Electrochemical Society vol. 149 No. 5 pp.A603–A606 (2002).
Page 589–593, Bockris, J.O.M. and Srinivasan, S. "Fuel Cells: Their Electrochemistry" McGraw–Hill, Inc., NY (1969)).
Korvin; "Hydrazine" Khimiya Moscow 1980 (in Russian) pp. 205–224.
"Formic Acid Oxidation on Pure and Bi–Modified Pt (111):Temperature Effects" Schmidt et al. Langmuir 2000, 16, pp.8159–8166.

(List continued on next page.)

*Primary Examiner*—Cephia D. Toomer
(74) *Attorney, Agent, or Firm*—Mark M. Friedman

(57) ABSTRACT

A fuel composition for fuel cells includes a polar solvent such as water, a first portion of a first fuel dissolved in the solvent at a saturated concentration, and a second portion of the first fuel suspended in the solvent to serve as a reservoir of fuel as the dissolved portion is consumed. Preferably, the first fuel is a hydride such as $NaBH_4$. Optionally, the fuel composition also includes a second fuel such as an alcohol that also controls the solubility of the first fuel in the solvent, inhibits decomposition of the first fuel and stabilizes the suspension. Preferably, the fuel composition also includes an additive such as an alkali for stabilizing the first fuel.

37 Claims, 3 Drawing Sheets-

OTHER PUBLICATIONS

"Electrocatalytic oxidation of aliphatic alcohols: Application to the direct alcohol fuel cell (DAFC)" Lamy et al, Journal of Applied Electrochemistry 31: pp. 799–809.

"ECS—New fuels as Alternatives to Methano for Direct Oxidation Fuel Cells" Peled et al, Electrochemical and Solid–State Letters, pp. A38–A41.

"Electrochemical Oxidation of Ethanol at Thermally Prepared $RuO_2$ –Modified Electrodes in Alkaline Media" Kim et al. Journal of Applied Electrochemistry 146: pp. 1075–1080.

"Performance of a co–electrodeposited Pt–Ru electrode for the electro–oxidation of ethanol studied by in situ FTIR spectroscopy" Souza et al, Journal of Electroanalytical Chemistry 420, pp. 17–20.

"Porous electrodes in the presence of a concentration gradient" Lasia, Journal of Electroanalytical Chemistry 428 (1997) pp. 155–164.

"Kinetic and mechanistic study of methanol oxidation on a Pt (111) surface in alkaline media" Tripkovic et al, Journal of Electroanalytical Chemistry 418 (1996) pp. 9–20.

* cited by examiner

SUSPENSIONS FOR USE AS FUEL FOR ELECTROCHEMICAL FUEL CELLS

This application claims priority from U.S. provisional patent application Ser. No. 60/399,167, filed Jul. 30, 2002. This application is a continuation-in-part of U.S. patent application Ser. No. 09/752,551, filed Jan. 3, 2001, now U.S. Pat. No. 6,554,877.

FIELD AND BACKGROUND OF THE INVENTION

The present invention relates to suspension fuel compositions for use in electrochemical fuel cells, a method of producing electricity with the suspension fuel compositions, and a fuel cell using the suspension fuel compositions to generate electricity.

A fuel cell is a device that converts the energy of a chemical reaction into electricity. Among the advantages that fuel cells have over other sources of electrical energy are high efficiency and environmental friendliness. Although fuel cells are increasingly gaining acceptance as electrical power sources, there are technical difficulties that prevent the widespread use of fuel cells in many applications, especially mobile and portable applications.

A fuel cell produces electricity by bringing a fuel into contact with a catalytic anode while bringing an oxidant into contact with a catalytic cathode. When in contact with the anode, the fuel is oxidized at catalytic centers to produce electrons. The electrons travel from the anode to the cathode through an electrical circuit connecting the electrodes. Simultaneously, the oxidant is catalytically reduced at the cathode, consuming the electrons generated at the anode. Mass balance and charge balance are preserved by the corresponding production of ions at either the cathode or the anode and the diffusion of these ions to the other electrode through an electrolyte with which the electrodes are in contact.

A common type of fuel cell uses hydrogen as a fuel and oxygen as an oxidant. Specifically, hydrogen is oxidized at the anode, releasing protons and electrons as shown in equation 1:

$$H_2 \rightarrow 2H^+ + 2e^- \tag{1}$$

The protons pass through the electrolyte towards the cathode. The electrons travel from the anode through an electrical load and to the cathode. At the cathode, the oxygen is reduced, combining smith electrons and protons produced from the hydrogen to form water as shown in equation 2:

$$O_2 + 4H^+ + 4e^- \rightarrow 2H_2O \tag{2}$$

Although fuel cells using hydrogen as a fuel are simple, clean and efficient, the extreme flammability of hydrogen and the bulky high-pressure tanks necessary for storage and transport of hydrogen mean that hydrogen powered fuel cells are inappropriate for many applications.

In general, storage, handling and transport of liquids are simpler than for gases. Thus, liquid fuels have been proposed for use in fuel cells. Methods have been developed for converting liquid fuels such as methanol into hydrogen, in situ. These methods are not simple, requiring a fuel pre-processing stage and a complex fuel regulation system.

Fuel cells that directly oxidize liquid fuels are the solution to this problem. Because the fuel is directly fed into the fuel cell, direct liquid-feed fuel cells are comparatively simple. Most commonly, methanol has been used as the fuel in these types of cells, as it is cheap, available from diverse sources and has a high specific energy (5020 Ampere hours per liter).

In direct-feed methanol fuel cells, the methanol is catalytically oxidized at the anode, producing electrons, protons and carbon monoxide, as shown in equation 3:

$$CH_3OH \rightarrow CO + 4H^+ + 4e^- \tag{3}$$

Carbon monoxide tightly binds to the catalytic sites on the anode. The number of available sites for further oxidation is reduced, reducing power output. One solution to this problem is to use anode catalysts, such as platinum/ruthenium alloys, which are less susceptible to CO adsorption. Another solution is to introduce the fuel into the cell as an "anolyte", a mixture of methanol Keith an aqueous liquid electrolyte. The methanol reacts with water at the anode to produce carbon dioxide and hydrogen ions, as shown in equation 4:

$$CH_3OH + H_2O \rightarrow 6H^+ + CO_2 + 6e^- \tag{4}$$

In fuel cells that use anolytes, the composition of the anolyte is an important design consideration. The anolte must have both a high electrical conductivity and high ionic mobility at the optimal fuel concentration. Acidic solutions are most commonly used. Unfortunately, acidic anolytes are most efficient at relatively high temperatures, temperatures at which the acidity can passivate or destroy the anode. Anolytes with a pH close to 7 are anode-friendly, but have an electrical conductivity that is too low for efficient electricity generation. Consequently, most prior art direct methanol fuel cells use solid polymer electrolyte (SPE) membranes.

In a cell using a SPE membrane, the cathode is exposed to oxygen in the air and is separated from the anode by a proton exchange membrane that acts both as an electrolyte and as a physical barrier preventing leakage from the anode compartment wherein the liquid anolyte is contained. One membrane commonly used as a fuel cell solid electrolyte is a perfluorocarbon material sold by E. I. DuPont de Nemours (Wilmington, Del.) under the trademark "Nafion". Fuel cells using SPE membranes have a higher power density and longer operating lifetimes than other anolyte-based fuel cells.

A practical disadvantage of SPE membrane fuel cells arises from the tendency of high concentrations of methanol to dissolve the membrane and to diffuse through it. As a result, a significant proportion of methanol supplied to the cell is not utilized for generation of electricity, but either is lost through evaporation or is oxidized directly at the cathode, generating heat instead of electricity.

The problem of membrane penetration by the fuel is overcome by using anolytes with a low (at most 3%) methanol content. The low methanol content limits the efficiency of the fuel cell when measured in terms of electrical output as a function of volume of fuel consumed and raises issues of fuel transportation, dead weight and waste disposal. Further limiting the use of low methanol content anolyte-based liquid feed fuel cells, especially for mobile and portable applications, is the expense and complexity of necessary peripheral equipment for fuel circulation, replenishment, heating and degassing.

Finally, despite having a high specific energy, methanol is rather unreactive at room temperature, which limits the specific power output of a methanol fuel cell to about 15 milliwatts per square centimeter.

Other organic compounds, notably higher alcohols, hydrocarbons and acetates, have been proposed as fuels for fuel cells. See, for example, O. Savadogo and X. Yang, "The electrooxidation of some acetals for direct hydrocarbons fuel cell applications", *IIIrd International Symposium on Electrocatalysis*, Slovenia, 1999, p. 57, and C. Lamy et al., "Direct anodic oxidation of methanol, ethanol and higher alcohols and hydrocarbons in PEM fuel cells", *IIIrd International Symposium on Electrocatalysis*, Slovenia, 1999, p. 95. Most of these candidates have shown very little promise, because of low electrochemical activity, high cost, and, in some cases, toxicity.

Inorganic water-soluble reducing agents, such as metal hydrides, hydrazine and hydrazine derivatives also have been proposed as fuels for fuel cells. See, for example, S. Lel, "The characterization of an alkaline fuel cell that uses hydrogen storage alloys", *Journal of the Electrochemical Society* vol. 149 no. 5 pp. A603–A606 (2002), J. O'M. Bockris and S. Srinivasan, *Fuel Cells: Their Electrochemistry*, McGraw-Hill. New York, 1969, pp. 589–593, and N. V. Korvin, *Hydrazine*, Khimiya, Moscow, 1980 (in Russian), pp. 205–224. Such compounds have high specific energies and are highly reactive.

One such compound is $NaBH_4$. In water $NaBH_4$ dissociates to $Na^+$ and $BH_4^-$. In a neutral solution, $BH_4^-$ is oxidized at the anode according to equation 5:

$$BH_4^- + 2H_2O \rightarrow BO_2^- + 8H^+ + 8e^- \quad (5)$$

The greatest disadvantage of hydrogen-containing inorganic compounds as fuel is their decomposition in acid and neutral solutions. For example. $BH_4^-$ decomposes according to equation 6:

$$BH_4^- + 2H_2O \rightarrow BO_2^- + 4H_2 \quad (6)$$

In a basic solution, $BH_4^-$ is oxidized at the anode according to equation 7:

$$BH_4^- + 8OH^- \rightarrow BO_2^- + 5H_2O + 8e^- \quad (7)$$

The corresponding reduction of gaseous oxygen at the cathode proceeds according to equation 8:

$$O_2 + 2H_2O + 4e^- \rightarrow 4OH^- \quad (8)$$

Mass balance and charge balance are preserved by diffusion of hydroxyl ions from the cathode to the anode via the electrolyte.

Although $BH_4^-$ is stable in basic solutions it decomposes on contact with a catalyst such as is present on the anode of a fuel cell, in accordance with equation 6, even when there is no electrical load on the fuel cell. Although the hydrogen gas produced by this reaction also can be oxidized at the anode, in accordance Faith equation 1, the half-reaction represented by equation 7 is much more efficient, energetically, than the half-reaction represented by the combination of equations 1 and 6. In addition, the catalytic decomposition of $BH_4^-$ at the anode tends to shorten the anode's service life.

This problem was addressed in PCT Application No. WO/02/054506, which is incorporated by reference for all purposes as if fully set forth herein, by adding an alcohol such as methanol to the basic $NaBH_4$ solution. In addition to serving as a fuel in its own right, such an alcohol inhibits decomposition of hydride species such as $BH_4^-$ at the anode. It is believed that the alcohol inhibits decomposition of hydride species at the anode by at least one of two mechanisms. The first mechanism is that adsorption of alcohol molecules to the anode catalytic sites sterically obstructs access of the hydride species to the catalytic sites. The second mechanism is that alcohol molecules solvate the hydride species.

Intuitively, it would be expected that capacity (measured in Ampere hours) of a fuel cell that runs on hydride fuel would be a linear function of the hydride concentration. For example, the solubility of $NaBH_4$ in 3M KOH is 1.25 moles per liter, and the solubility of $NaBH_4$ in 3M NaOH is 4 moles per liter, so the capacity of a fuel cell that runs on 3M NaOH saturated with $NaBH_4$ would be expected to be four times that of a fuel cell that runs on 3M KOH saturated with $NaBH_4$. Experimentally, this is not the case.

FIG. 1 shows, schematically, a fuel cell 10 that consists of an electrolyte chamber 12 that is bounded on either side by a cathode 14 and an anode 16 and that contains an electrolyte. Cathode 14 and anode 16 are shown connected by an electrical load 20 and by an ammeter 22 for measuring the electrical current drawn by electrical load 20. On the other side of anode 16 from electrolyte chamber 12 is a fuel chamber 18 that contains a fuel solution. The oxidant is atmospheric oxygen that reaches cathode 14 on the other side of cathode 14 from electrolyte chamber 12. In the specific fuel cell 10 used in the experiments reported herein, the volume of electrolyte chamber 12 was 2 cm$^3$, the volume of fuel chamber 18 was 15 cm$^3$, and the area of each electrodes 14 and 16 was 4 cm$^2$. Cathode 14 was made by screen-printing 20% platinum on activated carbon on water-proof paper. Anode 16 seas made by screen-printing 20% platinum and 10% ruthenium on activated carbon on hydrophilic carbon paper.

The capacity of fuel cell 10 was measured using different concentrations of $NaBH_4$ in a 3.3M aqueous NaOH fuel solution in fuel chamber 18 and using a 6M aqueous KOH electrolyte in electrolyte chamber 12. $m_F$, the effective mass of $NaBH_4$ used, was determined as a function of initial $NaBH_4$ concentration using Faraday's law:

$$m_I = \frac{CM}{Fn} \quad (9)$$

where C is the measured capacity in Ampere hours, F=26.8 Ampere hours per mole is Faraday's constant, M=38 g/mole is the molecular weight of $NaBH_4$, and n=8 is the number of electrons released per $BH_4^-$ anion in equation 7. The results are plotted in FIG. 2. $m_F$ increases with increasing initial $NaBH_4$ concentration, but not linearly. The higher the initial $NaBH_4$ concentration, the less efficiently the $NaBH_4$ is used. Furthermore when the $NaBH_4$ content of the fuel solution exceeded about 50 grams per liter, there was intensive fuel decomposition at anode 16. This, in turn, led to active gas liberation and foam formation, anode process pulsation and gradual destruction of anode 16. Increased initial concentration of $NaBH_4$ also promoted crossover of $NaBH_4$ through anode 16 via the electrolyte to cathode 14.

There is thus a widely recognized need for, and it would be highly advantageous to have, a fuel composition for fuel cells that allows a hydride fuel to be used to its full capacity.

SUMMARY OF THE INVENTION

According to the present invention there is provided a fuel composition including: (a) a solvent; (b) a first portion of a first fuel, dissolved in the solvent; and (c) a second portion of the first fuel, suspended in the solvent.

According to the present invention there is provided a method of generating electricity including the steps of: (a) providing a fuel cell including a cathode and an anode; (b) contacting an oxidizer with the cathode; and (c) contacting a fuel composition with the anode, the fuel composition including: (i) a solvent, (ii) a first portion of a fuel, dissolved in the solvent, and (iii) a second portion of the fuel, suspended in the solvent.

The present invention is a fuel composition for fuel cells in which a first fuel is stored in two forms. A first portion of the first fuel is stored in solution in a solvent. A second portion of the first fuel is stored in suspension in the solvent. The effective concentration of the first fuel is the concentration of the first fuel in solution, and this concentration is kept low enough to preclude undesirable side effects such as decomposition of the first fuel at the anode and destruction of the anode. As the dissolved first fuel is used up, it is replaced by dissolution of the suspended first fuel. The effective mass of the first fuel is close to the total mass of the two portions of the first fuel.

Preferably, the solvent is a polar solvent such as water. Preferably, the concentration of dissolved first fuel is the saturated concentration of the first fuel in the solvent. During the course of the operation of a fuel cell, as the dissolved first fuel is consumed, the suspended first fuel replaces the dissolved first fuel in solution and so maintains the dissolved portion of the first fuel at its saturated concentration.

Preferably, the first fuel is a salt whose anion is a product of a reduction half-reaction, in the solvent, that has a standard reduction potential more negative than the standard reduction potential of a hydrogen electrode in the solvent. For example. $BH_4^-$, the anion of $NaBH_4$, is the anion produced in the reduction half-reaction (in water)

$$HBO_3^- + 5H_2O + 8e^- \rightarrow 8OH^- \qquad (10)$$

which has a standard reduction potential of −1.24 volts.

Preferably the first fuel is a hydride such as $LiAlH_4$, $NaBH_4$, $LiBH_4$, $(CH_3)_3NHBH_3$, $NaAlH_4$, $NaCNBH_3$, $CaH_2$. LiH, NaH or KH. Most preferably, the first fuel is $NaBH_4$. Other preferred first fuels include $Na_2S_2O_3$, $Na2HPO3$. $Na_2HPO_2$. $K_2S_2O_3$, $K_2HPO_3$, $K_2HPO_2$, NaCOOH and KCOOH, which, like the hydrides, are salts whose anions have standard reduction potentials in water that are more negative than the standard reduction potential of a hydrogen electrode in water. For solvents generally, the preferred fuels for any specific solvent include salts whose anions have standard reduction potentials in that solvent that are more negative than the standard reduction potential of a hydrogen electrode in that solvent. Preferably, the first fuel constitutes between about 0.1% and about 80% of the fuel composition by weight. Most preferably, the first fuel constitutes between about 5% and about 25% of the fuel composition by sleight.

Optionally, the fuel composition of the present invention also includes an alcohol, for example methanol, ethanol, propanol, butanol, pentanol, hexanol, ethylene glycol or glycerol. Preferably, the alcohol constitutes between about 0.1% and about 50% of the fuel composition by weight. Most preferably, the alcohol constitutes between about 1% and about 25% of the fuel composition by weight. The alcohol serves four functions:

1. The alcohol is a second fuel that is oxidized along with the first fuel at the anode of the fuel cell.
2. The alcohol controls the solubility of the first fuel in the solvent, to ensure that the saturated concentration of the first fuel is not too high.
3. As in WO/02/054506 with respect to $NaBH_4$, the alcohol inhibits the decomposition of the first fuel at the anode of the fuel cell.
4. The alcohol stabilizes the suspension by being present, in the solution of the first fuel in the solvent, in a proportion that makes the density of the solution substantially equal to the density of the suspended portion of the first fuel, so that the suspended portion of the first fuel neither precipitates nor floats, but remains suspended.

The scope of the present invention also includes the use of any suitable additive for any of these four purposes, but alcohols are the preferred additives.

Preferably, the fuel composition of the present invention includes an additive for stabilizing the dissolved portion of the first fuel in the solvent. Preferably, this additive is an alkali such as LiOH, NaOH or KOH, or a basic salt. Preferably, this additive is present in the solvent in a concentration between about 0.1 mole/liter and about 12 mole/liter. Most preferably, this additive is present in the solvent in a concentration between about 0.2 mole/liter and about 5 mole/liter.

Osborg, in U.S. Pat. No. 4,081,252, teaches a fuel composition, for combustion rather than for use in a fuel cell, that, similar to the present invention, includes a "hydrogen carrier" such as hydrazine, a hydrazine derivative or an inorganic borohydride, that, according to the abstract of the patent, may be dissolved or suspended in a base fuel. All the examples presented by Osborg, however, are of hydrogen carriers that are dissolved in the base fuel. There is no indication in Osborg of any utility to both dissolving and suspending a hydrogen carrier in the base fuel.

The scope of the present invention also includes a fuel cell that is fueled by the fuel composition of the present invention, as well as a method of generating electricity using such a fuel cell.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a fuel composition which can be used to generate electricity in a fuel cell. Specifically, the present invention allows a hydride fuel to be used efficiently by a fuel cell.

The principles and operation of a fuel composition for fuel cells according to the present invention may be better understood with reference to the drawings and the accompanying description.

Figure 1:
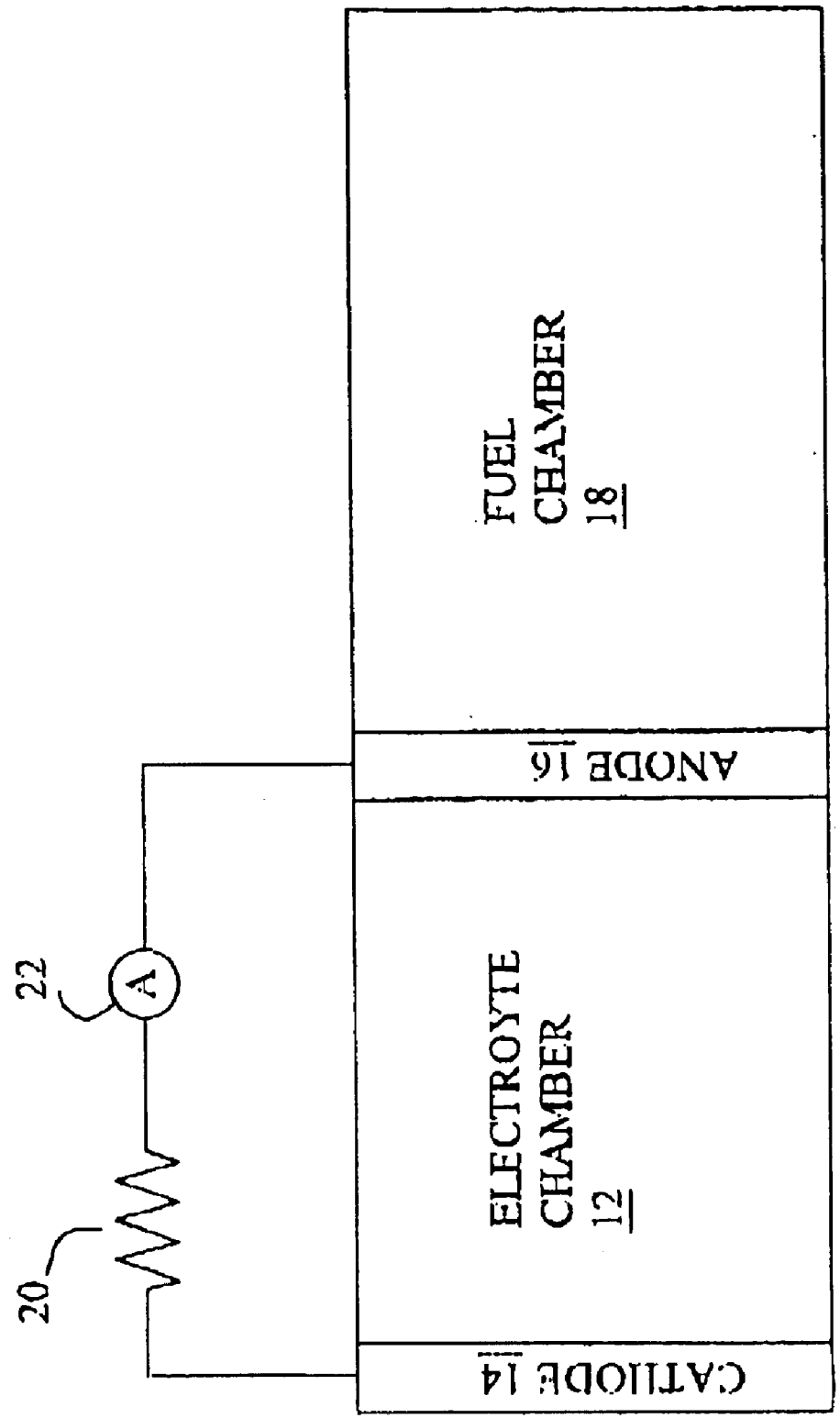
FIG. 1 is a schematic diagram of a fuel cell.
Figure 2:
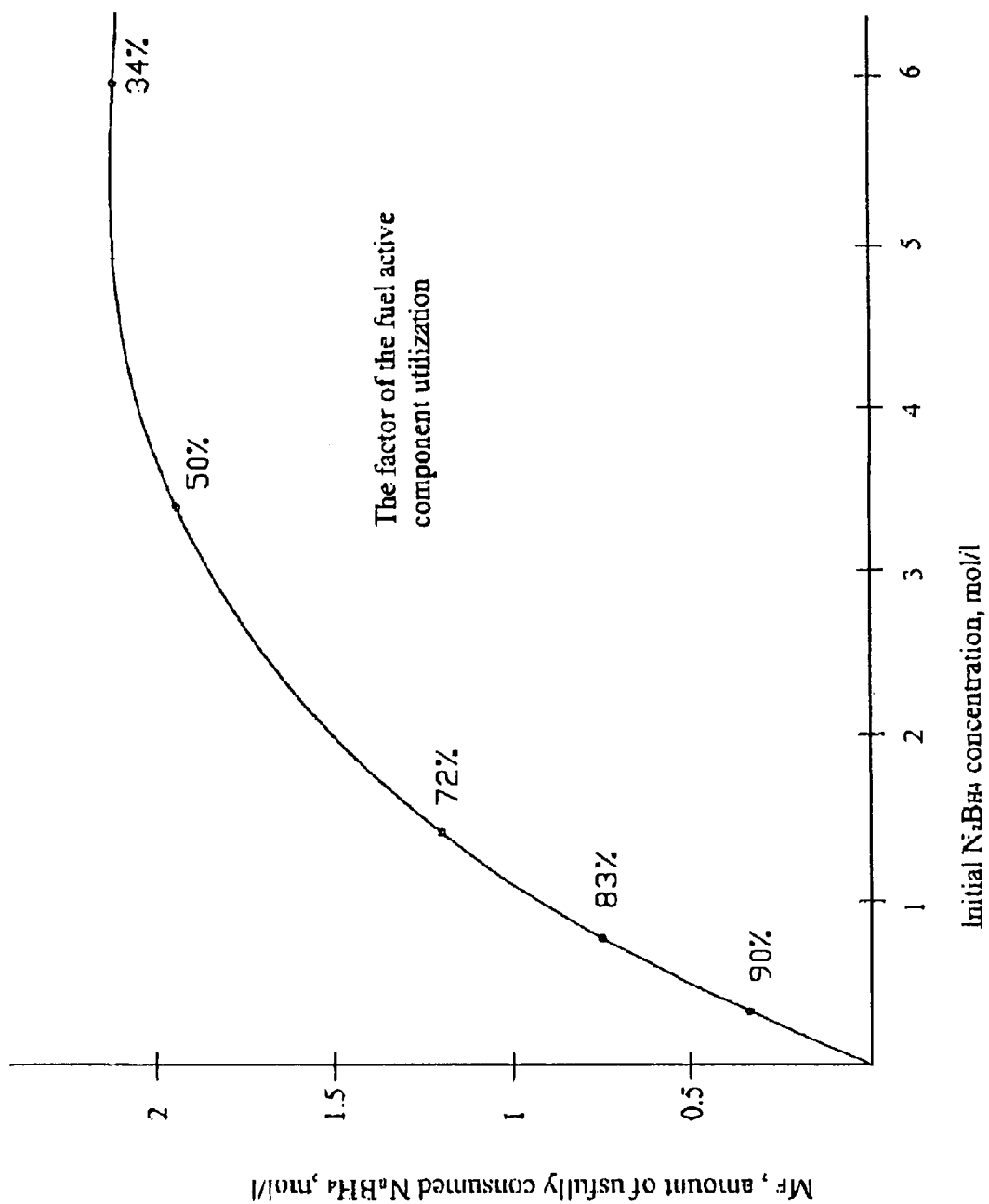
FIG. 2 is a plot of the effective mass of $NaBH_4$ vs. initial $NaBH_4$ concentration in a series of prior art fuel compositions.

Returning now to the drawings. FIG. 1, in addition to illustrating a prior art fuel cell, also serves to illustrate a fuel cell of the present invention, with a fuel composition of the present invention substituted for the prior art fuel solution in fuel chamber 18.

Figure 3:
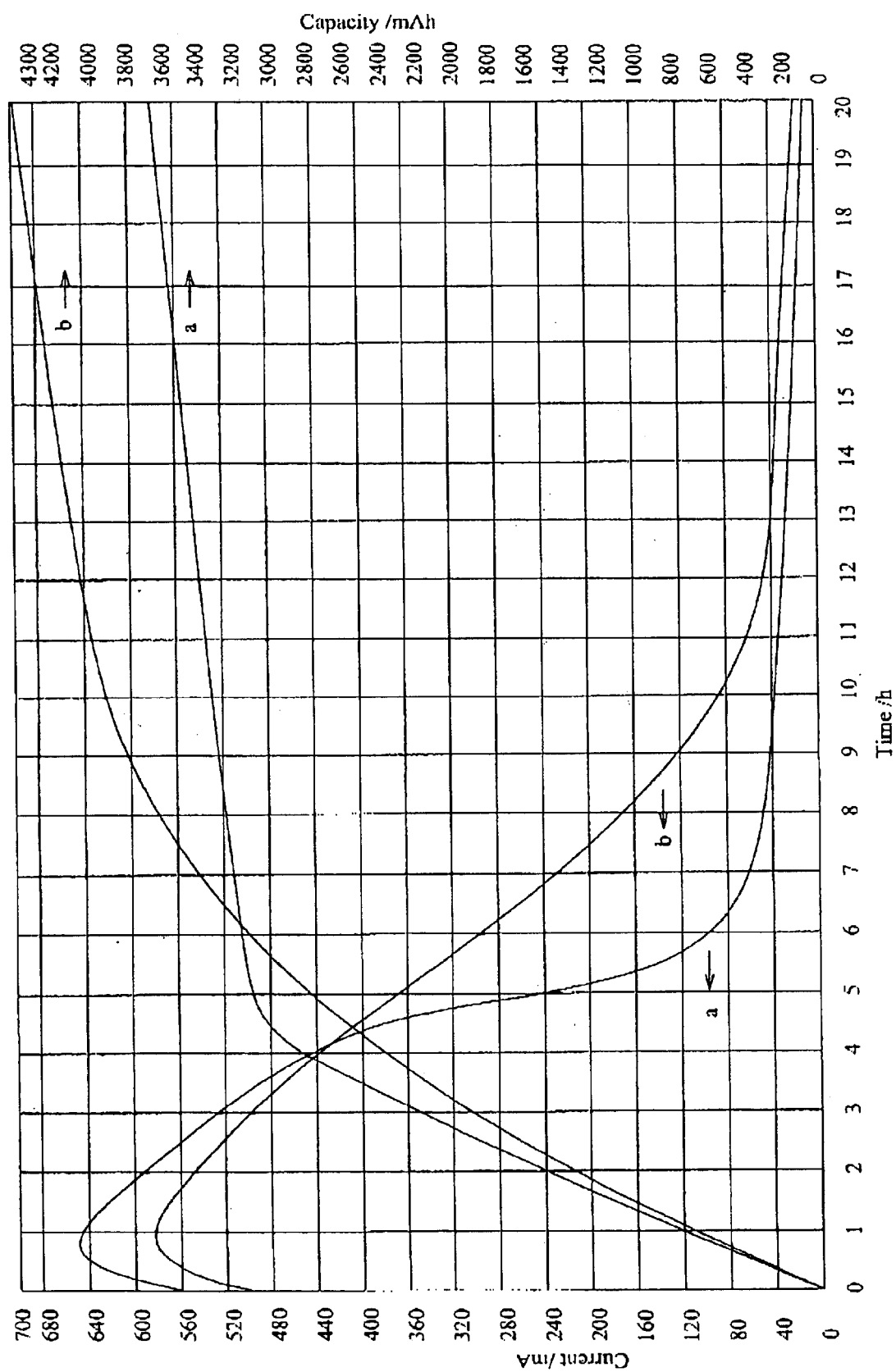
FIG. 3 shows plots of electrical currents and capacities of the fuel cell of FIG. 1, for a fuel composition of the present invention vs. a prior art fuel composition.

A fuel composition of the present invention was prepared by preparing a saturated solution of $NaBH_4$ in 3M aqueous KOH and adding solid powdered $NaBH_4$ and agitating with a magnetic stirrer to create a suspension of $NaBH_4$ in the $NaBH_4^-$ saturated KOII solution. The mean $NaBH_4$ particle size was about 10 microns, and 90% of the $NaBH_4$ particles were smaller than 100 microns. The suspension was stabilized by the addition of 10% glycerol by volume to act as a dispersant. The 10% glycerol dispersant, by giving the $NaBH_4$-saturated KOH solution a density of 1.12 g/cm$^2$, also keeps the $NaBH_4$ particles uniformly dispersed in suspension. The glycerol dispersant also keeps the $NaBO_2$ reaction product in suspension, thereby preventing the reaction product from reducing the catalyst activity in anode 16 and also preventing the reaction product from reducing the fuel utilization efficiency. The initial ratio of suspended $NaBH_4$ to dissolved $NaBH_4$ was 1:1. The electrical current produced by fuel cell 10, as well as the corresponding capacity (integrated current), were measured with fuel cell 10 fueled by this fuel composition vs. a solution of $NaBH_4$ in 3M aqueous NaOH. The concentration of dissolved $NaBH_4$ both in the fuel composition of the present invention and in the prior art fuel solution, was 1.25M, which is the saturation concentration of $NaBH_4$ in 3M aqueous KOH. Load 20 was fixed at 0.5 volts. FIG. 3 shows the measured electrical currents in milliamperes (left ordinate), and capacities, in milliampere hours (right ordinate), as functions of time, in hours. The curves labeled "a" are for the prior art fuel solution. The curves labeled "b" are for the fuel composition of the present invention. The fuel composition of the present invention provides steadier electrical current and higher capacity than the prior art fuel solution.

While the invention has been described with respect to a limited number of embodiments, it will be appreciated that many variations, modifications and other applications of the invention may be made.

What is claimed is:

1. A fuel composition comprising:
   (a) a solvent;
   (b) a first portion of a first fuel, dissolved in said solvent, a concentration of said first portion of said first fuel being a saturated concentration thereof, said first fuel being selected from the group consisting of $Na_2S_2O_3$, $Na_2HPO_3$, $Na_2HPO_2$, $K_2S_2O_3$, $K_2HPO_3$, $K_2HPO_2$, NaCOOH and KCOOH; and
   (c) a second portion of said first fuel, suspended in said solvent.

2. The fuel composition of claim 1, wherein said solvent is a polar solvent.

3. The fuel composition of claim 1, wherein said polar solvent is water.

4. The fuel composition of claim 1, wherein said second portion of said first fuel is between about 0.1% of the fuel composition and about 80% of the fuel composition by weight.

5. The fuel composition of claim 4, wherein said second portion of said first fuel is between about 5% of the fuel composition and about 25% of the fuel composition by weight.

6. The fuel composition of claim 1, further comprising:
   (d) a second fuel, dissolved in said solvent.

7. The fuel composition of claim 6, wherein said second fuel is an alcohol.

8. The fuel composition of claim 7, wherein said alcohol is selected from the group consisting of methanol, ethanol, propanol, butanol, pentanol, hexanol, ethylene glycol and glycerol.

9. The fuel composition of claim 6, wherein said second fuel is between about 0.1% of the fuel composition and about 50% of the fuel composition by weight.

10. The fuel composition of claim 9, wherein said second fuel is between about 1% of the fuel composition and about 25% of the fuel composition by weight.

11. The fuel composition of claim 1, further comprising:
    (d) an additive for controlling a solubility of said first fuel in said solvent.

12. The fuel composition of claim 11, wherein said additive is an alcohol.

13. The fuel composition of claim 12, wherein said alcohol is selected from the group consisting of methanol, ethanol, propanol, butanol, pentanol, hexanol, ethylene glycol and glycerin.

14. The fuel composition of claim 11, wherein said additive is between about 0.1% of the fuel composition and about 50% of the fuel composition by weight.

15. The fuel composition of claim 14, wherein said additive is between about 1% of the fuel composition and about 25% of the fuel composition by weight.

16. The fuel composition of claim 1, further comprising an additive for inhibiting decomposition of said first fuel at an anode of a fuel cell.

17. The fuel composition of claim 16, wherein said additive is an alcohol.

18. The fuel composition of claim 17, wherein said alcohol is selected from the group consisting of methanol, ethanol, propanol, butanol, pentanol, hexanol, ethylene glycol and glycerol.

19. The fuel composition of claim 16, wherein said additive is between about 0.1% of the fuel composition and about 50% of the fuel composition by weight.

20. The fuel composition of claim 19, wherein said additive is between about 1% of the fuel composition and about 25% of the fuel composition by weight.

21. The fuel composition of claim 1, further comprising:
    (d) an additive for stabilizing said first portion of said first fuel in said solvent.

22. The fuel composition of claim 21, wherein said additive is an alkali.

23. The fuel composition of claim 22, wherein said alkali is selected from the group consisting of LiOH, NaOH and KOH.

24. The fuel composition of claim 21, wherein said additive is a basic salt.

25. The fuel composition of claim 21, wherein a concentration of said additive in said solvent is between about 0.1 mole/liter and about 12 mole/liter.

26. The fuel composition of claim 25, wherein a concentration of said additive in said solvent is between about 0.2 mole/liter and about 5 mole/liter.

27. The fuel composition of claim 1, further comprising:
    (d) an additive for stabilizing said suspension.

28. The fuel composition of claim 27, wherein said additive is an alcohol.

29. The fuel composition of claim 28, wherein said alcohol is selected from the group consisting of methanol, ethanol, propanol, butanol, pentanol, hexanol, ethylene glycol and glycerol.

30. The fuel composition of claim 27, wherein said additive is present in a proportion sufficient to give said solution of said first portion of said first fuel in said solvent a density substantially equal to a density of said second portion of said first fuel.

31. A fuel cell comprising the fuel composition of claim 1.

32. A fuel composition comprising:
(a) a solvent;
(b) a first portion of a first fuel, dissolved in said solvent, a concentration of said first portion of said first fuel being a saturated concentration thereof;
(c) a second portion of said first fuel, suspended in said solvent; and
(d) an additive for controlling a solubility of said first fuel in said solvent.

33. The fuel composition of claim 32, wherein said first fuel is a salt, an anion whereof is a product of a reduction half-reaction, in said solvent, that has a standard reduction potential more negative than a standard reduction potential of a hydrogen electrode in said solvent.

34. The fuel composition of claim 33, wherein said first fuel is selected from the group consisting of $LiAlH_4$, $NaBH_4$, $LiBH_4$, $(CH_3)_3NHBH_3$, $NaAlH_4$, $NaCNBH_3$, $CaH_2$, $LiH$, $NaH$, $KH$, $Na_2S_2O_3$, $Na_2HPO_3$, $Na_2HPO_2$, $K_2S_2O_3$, $K_2HPO_3$, $K_2HPO_2$, $NaCOOH$ and $KCOOH$.

35. A fuel composition comprising:
(a) a solvent;
(b) a first portion of a first fuel, dissolved in said solvent, a concentration of said first portion of said first fuel being a saturated concentration thereof;
(c) a second portion of said first fuel, suspended in said solvent; and
(d) an additive for inhibiting decomposition of said first fuel at an anode of a fuel cell.

36. The fuel composition of claim 35, wherein said first fuel is a salt, an anion whereof is a product of a reduction half-reaction, in said solvent, that has a standard reduction potential more negative than a standard reduction potential of a hydrogen electrode in said solvent.

37. The fuel composition of claim 36, wherein said first fuel is selected from the group consisting of $LiAlH_4$, $NaBH_4$, $LiBH_4$, $(CH_3)_3NHBH_3$, $NaAlH_4$, $NaCNBH_3$, $CaH_2$, $LiH$, $NaH$, $KH$, $Na_2S_2O_3$, $Na_2HPO_3$, $Na_2HPO_2$, $K_2S_2O_3$, $K_2HPO_3$, $K_2HPO_2$, $NaCOOH$ and $KCOOH$.

* * * * *